R. K. LE BLOND & W. F. GROENE.
GEARING.
APPLICATION FILED JUNE 1, 1909.

980,972.

Patented Jan. 10, 1911.
2 SHEETS—SHEET 1.

Witnesses

Inventors
Richard K. LeBlond and
William F. Groene
By Robt. O. Harris
Attorney

R. K. LE BLOND & W. F. GROENE.
GEARING.
APPLICATION FILED JUNE 1, 1909.
980,972.
Patented Jan. 10, 1911.
2 SHEETS—SHEET 2.
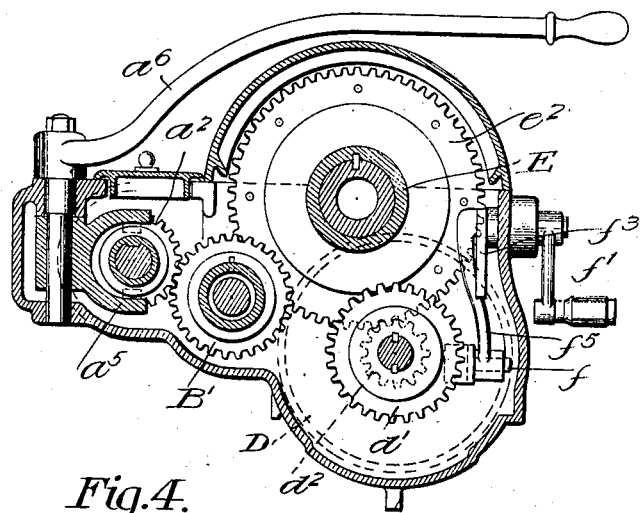
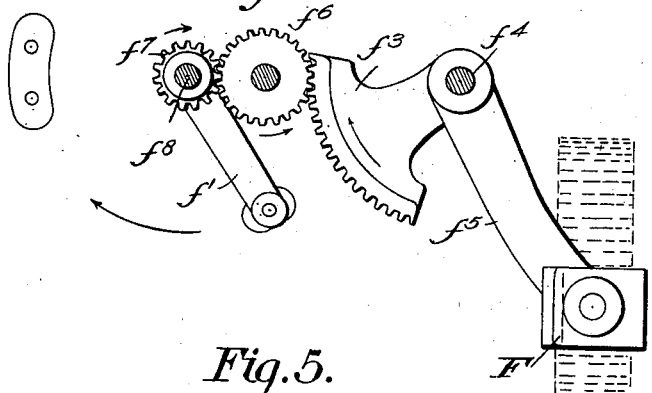
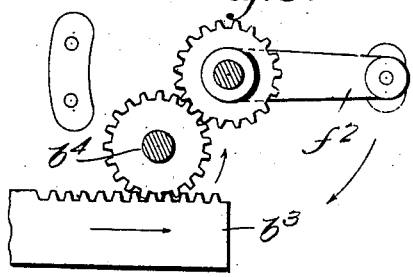
Witnesses
Inventors
Richard K. LeBlond and
William F. Groene
By Robt. P. Harris
Attorney

UNITED STATES PATENT OFFICE.

RICHARD K. LE BLOND AND WILLIAM F. GROENE, OF CINCINNATI, OHIO, ASSIGNORS TO R. K. LE BLOND MACHINE TOOL CO., OF CINCINNATI, OHIO, A CORPORATION OF OHIO.

GEARING.

980,972.   Specification of Letters Patent.   Patented Jan. 10, 1911.

Application filed June 1, 1909. Serial No. 499,541.

*To all whom it may concern:*

Be it known that we, RICHARD K. LE BLOND and WILLIAM F. GROENE, of Cincinnati, county of Hamilton, and State of Ohio, have invented a new and useful Improvement in Gearing, of which the following is a specification.

This invention pertains to certain new and useful improvements in lathes, and relates particularly to a lathe head provided with a speed changing mechanism which is designed particularly as an improvement upon the structures illustrated and described in Letters Patent 845,005 of February 19, 1907, and 857,562 of June 18, 1907.

One object of the invention is the production of improved means for securing an increase in the number of possible changes in the rate of rotation of the spindle with respect to the constant speed power, without increasing the size of the head or housing.

A further object is to so arrange the speed changing mechanism and the controlling means therefor that in moving the handles in a given direction, the speeds always increase in a regular proportion, thus avoiding the peculiar jumps in speeds that occur in the mechanisms covered by the patents above mentioned, which peculiarities are very difficult for an operator to become acquainted with.

A further object is to provide a maximum number of speed changes with a minimum number of gears.

Another object is to provide an improved direct reading index plate for indicating to the operator the different positions of the levers for securing the various speed changes.

The invention will be hereinafter fully set forth and particularly pointed out in the claims.

Figure 1:
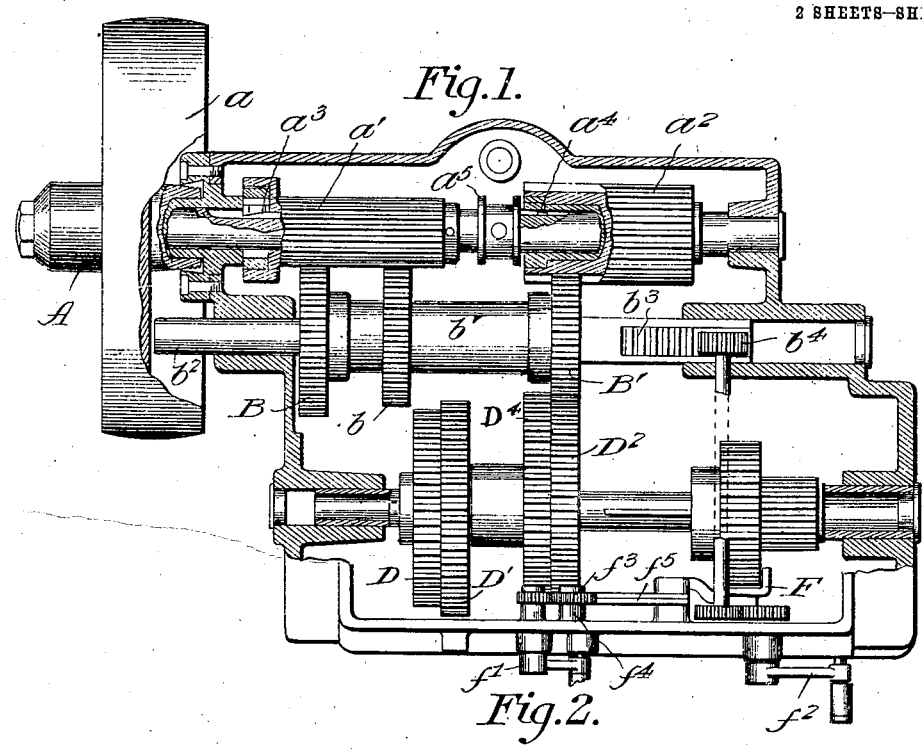
Figure 2:
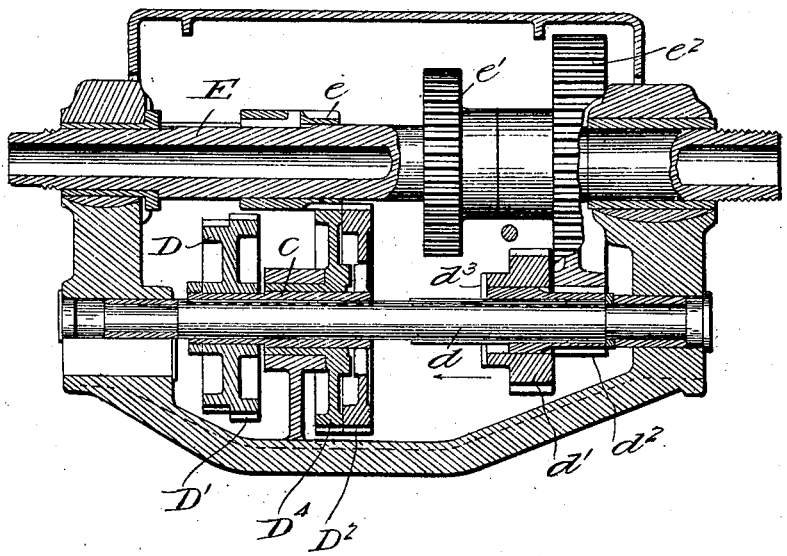

In the accompanying drawings:—Figure 1 is a front elevation of the head mechanism illustrating the speed changing gearing. Fig. 2 is a horizontal sectional view. Fig. 3 is a transverse sectional view. Figs. 4 and 5 are details; and Fig. 6 is a view of our improved direct reading index plate.

Referring to the drawings:—A designates the main shaft driven by a pulley $a$ receiving power from any suitable source. Mounted loosely on said shaft are two elongated pinions $a'$, $a^2$, said pinions being connected up with said shaft by means of the wedge members $a^3$, $a^4$, respectively, of a clutch $a^5$ operated by a lever $a^6$. Meshing with the pinion $a'$ is a gear B, and with the pinion $a^2$ is a gear B'. These gears together with a pinion $b$ are secured to a sleeve $b'$ mounted on the shaft $b^2$. Said sleeve $b'$ may be fastened to the shaft $b^2$, or may be allowed to revolve loosely thereon, as desired. In the construction illustrated, however, the said sleeve $b'$ is loosely mounted on the shaft $b^2$, and the gears are moved longitudinally by means of a rack $b^3$ on the shaft engaged by a pinion $b^4$. The object of this construction is to allow the gears B, B' and $b$ to move longitudinally and at the same time retain the gears B, B' always in mesh with the pinions $a'$, $a^2$.

The gears D, D', D$^2$ are mounted on a sleeve C which is keyed fast to a shaft $d$. Mounted on said shaft $d$ so as to slide loosely on a spline and key, are gears $d'$, $d^2$, the arrangement being such that the various speeds transmitted to this shaft $d$ will be carried by said gears $d'$, $d^2$. On the hub of gear $d'$ is a clutch $d^3$ of the ordinary tooth type, adapted to pass through an opening in the hub of gear D$^2$ to engage complementary teeth in the hub of a gear D$^4$. Said gear D$^4$ is loosely mounted upon the sleeve C. It will be noted that the gear D$^4$ is always in mesh with the gear $e$ on the main spindle E, so that when the gears $d'$, $d^2$, are slid to the extreme limit, the clutch on the gear $d'$ engages with the clutch on the pinion D$^4$, thereby revolving the spindle through the gear $e$ at the maximum speed. When the gears $d'$, $d^2$, are brought to the intermediate position, the gear $d'$ engages the gear $e'$ on shaft E, and in the extreme position, the gear $d^2$ engages with the gear $e^2$. These last two changes we term " back gear " changes, the first change being equivalent to the open belt on a belt driven machine. The first six changes taking the place of the cone.

The gear $d'$ is shifted by means of a yoke F operated by a handle $f'$ and the pinion $b^4$ is rotated by a handle $f^2$. In order to provide for a proportionate movement of the sleeve $b'$ and the gear $d'$ we provide a toothed segment $f^3$ pivotally mounted at $f^4$ and provided with an arm $f^5$ which engages the yoke F in such a manner that as the segment is rocked the gear $d'$ is shifted. Said segment meshes with a pinion $f^6$ which in turn meshes with a second pinion $f^7$ secured to the shaft $f^8$ to which pinion handle $f'$ is secured. The arrangement of the gear $d'$ and sleeve $b'$ is such that the speed of the driven shaft will always increase in a regular proportion as the handles $f'$ $f^2$ are moved in one direction, or correspondingly decreased in regular proportions as the handles are moved in the opposite direction. In practice we secure eighteen spindle speeds with the fourteen gears shown.

In order to aid the operator in making quick changes of speed and to accurately shift the lever or handle $f'$ for the purposes above described, we have arranged the index plate G which is designed to be attached to the cover of the machine in plain view of the operator. In the middle column $g$ of the plate are indicated the eighteen spindle speeds of which the head is capable; immediately to the left, at $g'$, the position of the levers for each speed is shown. The position of the levers for getting any definite speed can thus be determined at once by the operator without being obliged to carry a series of letters and numbers in his mind, while setting the handles. The index plate also gives, at $g^2$, the proper work diameter for surface speed, 40, 50 and 60 ft. a minute, from which the operator can determine at a glance the position of the levers to obtain the correct surface speed for the work. In making selection the spindle speed can be entirely ignored, the operator merely selecting the surface speed required for his work, and opposite this can be seen at once the position of the levers. To illustrate—suppose we have a piece of work 10″ diam., which we want to run at 50 ft. Looking down the column under 50 ft. we find 10¼ the nearest approximation to 10″. Opposite this can be seen at a glance the position of the levers. It will be noted that this does not necessitate taking the speed into consideration. Again—suppose we wish to run this work at 60 ft. Looking down the column under 60 ft., we find 9⅜ the nearest to 10″. Opposite, to the left, can be seen the position of the levers to give the proper surface speed. This table will be found useful for obtaining almost any surface speed, as it can be halved for 20, 25 and 30 ft., and doubled for 80, 100 and 120 ft. In this way it is an easy matter to select position of the levers for any surface speed from 20 to 120 ft.

Having thus fully described our invention, what we claim as new and desire to secure by Letters Patent of the United States is:—

1. A speed changing device comprising a driving shaft, a driven shaft, spaced apart pinions loosely mounted on said driving shaft, speed changing mechanism interposed between said shafts and including a shiftable sleeve, a plurality of gears thereon meshing with said pinions, and means for selectively connecting said pinions with said driving shaft.

2. A speed changing device comprising a driving shaft, a driven shaft, spaced apart pinions loosely mounted on said driving shaft, speed changing mechanism interposed between said shafts and including a shiftable sleeve, a plurality of gears thereon meshing with said pinions, and a clutch carried by said driving shaft, and constructed to engage either of said pinions.

3. A speed changing device comprising a driving shaft, a driven shaft, spaced apart pinions loosely mounted on said driving shaft, speed changing mechanism interposed between said shafts and including a shiftable sleeve, a plurality of gears thereon meshing with said pinions, and a clutch member provided with wedge shaped arms adapted to engage either of said pinions.

4. A speed changing device comprising a driving shaft, a driven shaft, elongated pinions loosely mounted on said driving shaft, speed changing mechanism interposed between said shafts and including a sleeve provided with a plurality of gears meshing with said pinions, means for shifting said sleeve, and means for selectively connecting said pinions with said drive shaft.

5. A speed changing device comprising a driving shaft, a driven shaft, elongated pinions loosely mounted on said driving shaft, means for selectively connecting said pinions with said driving shaft, a speed changing sleeve provided with gears arranged to mesh respectively with said pinions, and speed changing gearing meshing with the gears.

6. A speed changing mechanism comprising a driving shaft, a driven shaft, speed changing gears thereon, a speed changing sleeve, gears thereon driven by said driving shaft, a speed changing pinion for transmitting power to the gears on said driven shaft, gearing for driving said pinion and operatively connected with said sleeve, and levers controlling said sleeve and said pinion.

7. A speed changing mechanism comprising a driving shaft, a driven shaft, speed changing gears thereon, a speed changing sleeve, gears thereon driven by said driving shaft, a speed changing pinion for transmitting power to the gears on said driven shaft, gearing for driving said pinion and operatively connected with said sleeve, and levers controlling said sleeve and said pinion, said sleeve and pinion being arranged to progressively increase or decrease the speed of the driven shaft as the respective levers are moved in a given direction.

8. A speed changing mechanism comprising a driving shaft, a driven shaft, speed changing gears thereon, a speed changing sleeve operatively connected with said driving shaft, a handle for shifting said sleeve, a speed changing pinion arranged to transmit power to the gears on said driven shaft, gearing for driving said pinion and operatively connected with said sleeve, a toothed segment provided with an arm for engaging said pinion, and an operating handle for rocking said segment.

9. A speed changing device comprising a driving shaft, a driven shaft, elongated pinions mounted on said driving shaft, and slidably supported speed changing gears permanently meshing with said pinions, means for transmitting power from said speed changing gears to said driven shaft.

10. A speed changing device comprising a driving shaft, a driven shaft, elongated pinions mounted on said driving shaft, and slidably supported speed changing gears, permanently meshing with said pinions, means for transmitting power from said speed changing gears to said driven shaft, and means for selectively connecting said elongated pinions with said driving shaft.

11. A speed changing device comprising a driving shaft, a driven shaft, elongated pinions mounted on said driving shaft, and slidably supported speed changing gears permanently meshing with said pinions, means for transmitting power from said speed changing gears to said driven shaft, said elongated pinions being of different diameters.

12. A speed changing device comprising a driving shaft, a driven shaft, a pinion on said driven shaft, speed changing gears driven by said driving shaft, a slidable pinion operatively connected with said speed changing gears, and arranged to operate said driven shaft, a second pinion normally engaging the pinion on said driven shaft, and means for clutching said pinion with said slidable pinion.

13. A speed changing device comprising a driving shaft, a driven shaft, a pinion on said driven shaft, a countershaft, speed changing gears mounted on said counter shaft operated by said driving shaft, a driving pinion mounted on said counter shaft and normally engaging the pinion on said driven shaft, a slidable pinion on said counter shaft provided with means for operating said driving pinion, and means for connecting said driving pinion and said slidable pinion.

14. A speed changing device comprising a driving shaft, a driven shaft, a pinion on said driven shaft, a counter shaft, speed changing gears mounted on said counter shaft operated by said driving shaft, a driving pinion mounted on said counter shaft and normally engaging the pinion on said driven shaft, said driving pinion being interposed between two of said gears, and a slidable pinion keyed to said counter shaft and having a hub arranged to engage the hub of said driving gear.

15. A speed changing device comprising a driving shaft, a driven shaft, a pinion on said driven shaft, a counter shaft, speed changing gears mounted on said counter shaft operated by said driving shaft, a driving pinion mounted on said counter shaft and normally engaging the pinion on said driven shaft, said driving pinion being interposed between two of said gears and having its hub provided with clutch teeth, and a slidable pinion keyed to said counter shaft and having a hub provided with clutch teeth arranged to engage the clutch teeth of said driving gear.

16. A speed changing mechanism comprising a driving shaft, a driven shaft, spaced apart pinions loosely mounted on said driving shaft, means for selectively connecting said pinions with said driving shaft, a slidable sleeve, three gears thereon adapted to mesh with said pinions, a series of three change speed gears driven by said sleeve, and a series of three additional speed gears driven by the last mentioned speed gears and operatively connected with said driven shaft, whereby eighteen speed changes are secured.

In testimony whereof we hereunto set our hands this 29 day of May 1909, in the presence of two attesting witnesses.

RICHARD K. LE BLOND.
WILLIAM F. GROENE.

Witnesses:
 FRED LE BLOND,
 JOHN A. LE BLOND.